United States Patent [19]

Kawaharazuka

[11] Patent Number: 4,491,184
[45] Date of Patent: Jan. 1, 1985

[54] VIBRATION DAMPING DEVICE FOR MOWING MACHINE

[75] Inventor: Yukio Kawaharazuka, Ageo, Japan
[73] Assignee: Kioritz Corporation, Tokyo, Japan
[21] Appl. No.: 407,855
[22] Filed: Aug. 13, 1982

[30] Foreign Application Priority Data

Sep. 9, 1981 [JP] Japan .......................... 56-133157[U]

[51] Int. Cl.³ ............................................... E21B 3/00
[52] U.S. Cl. ............................... 173/162 R; 30/276; 267/136; 267/141.1
[58] Field of Search .................. 30/240, 276, 296; 173/162, 139; 267/136, 137, 139, 141.1, 141.4

[56] References Cited

U.S. PATENT DOCUMENTS

| | | | |
|---|---|---|---|
| 2,035,643 | 3/1936 | Douglass et al. | 173/162 |
| 2,639,115 | 5/1953 | Iredell | 267/141.4 |
| 3,179,185 | 4/1965 | O'Farrell | 173/139 X |
| 3,968,843 | 7/1976 | Shotwell | 267/137 X |
| 4,214,738 | 7/1980 | Casper | 267/141.1 |
| 4,236,310 | 12/1980 | Muller | 30/276 |

*Primary Examiner*—E. R. Kazenske
*Assistant Examiner*—Willmon Fridie, Jr.
*Attorney, Agent, or Firm*—Karl W. Flocks; Sheridan Niemark; A. Fred Starobin

[57] ABSTRACT

A vibration damping device for mowing machine, having an axially splittable outer sleeve and vibration damping rings received in free state by grooves formed in the inner surface of the outer sleeve. The outer sleeve is connected at its one end to an internal combustion engine, while the vibration damping rings are held by holding members which in turn are fitted around a handling tube of the mowing machine.

1 Claim, 5 Drawing Figures

VIBRATION DAMPING DEVICE FOR MOWING MACHINE

BACKGROUND OF THE INVENTION

The present invention relates to a vibration damping device for mowing machine and, more particularly, to a vibration damping device which is interposed between the handling tube and the internal combustion engine of the mowing machine so as to prevent as much as possible the transmission of vibration from the internal combustion engine to the grip of the handling rod which is gripped by the operator.

Hitherto, various types of vibration damping devices have been proposed for damping the vibration in hand-held mowing machine. One of these known damping devices incorporates a vibration damping rubber element fixed between an outer sleeve and an inner sleeve by bonding. Another known vibration damping device incorporates a doughnut-shaped vibration damping rubber element having stud bolts projecting from both sides thereof. Still another known vibration damping device incorporates a plurality of small cylindrical vibration damping rubber elements. It has been proposed also to construct a vibration damping device by suitably combining known vibration damping devices mentioned above. These known vibration damping devices, however, have both merits and demerits in various aspects such as vibration damping performance, maneuverability, productivity and so forth and, hence, could not be used completely satisfactorily.

BRIEF SUMMARY OF THE INVENTION

Accordingly, an object of the invention is to provide a vibration damping device for a mowing machine having a simple construction and a high utility thereby to overcome the above-described problems of the prior art. To this end, according to the invention, there is provided a vibration damping device especially for a hand-held mowing machine in which vibration damping ring is received by an outer sleeve which can be split along the axis thereof.

This vibration damping device can be assembled easily thanks to the split type construction of the outer sleeve and, hence, can be produced at a high productivity rate. In addition, the vibration damping performance is further improved because the outer peripheral surface of the vibration damping ring is not fixed to the outer sleeve but is merely held in contact with the latter.

The above and other objects, features and advantages of the invention will become more clear from the following description of the preferred embodiment when the same is read in conjunction with the accompanying drawings.

DESCRIPTION OF THE PREFERRED EMBODIMENT

Figure 1:
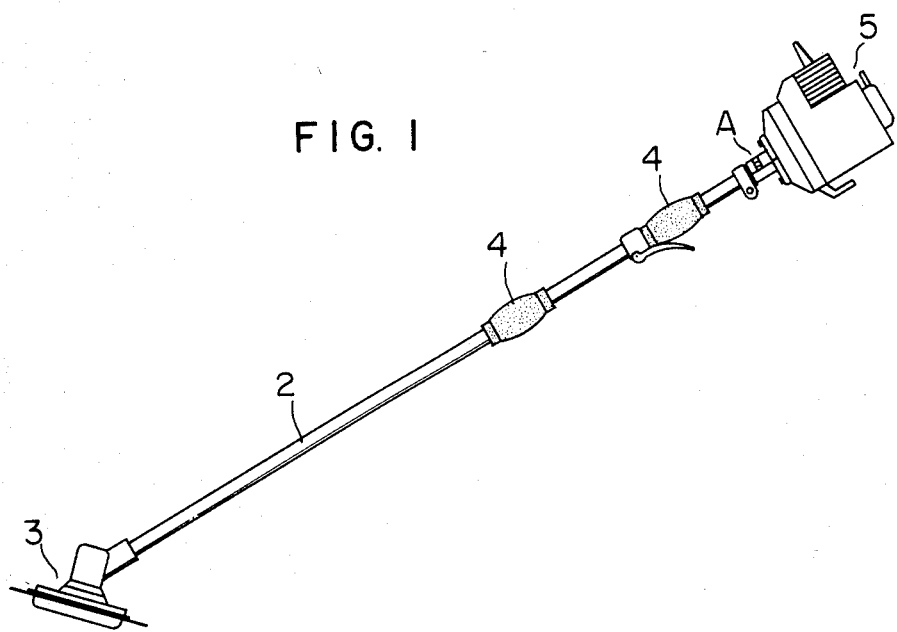
FIG. 1 is a side elevational view of a mowing machine incorporating a vibration damping device constructed in accordance with an embodiment of the invention.

Referring to the drawings, particularly to FIG. 1, a hand-held mowing machine to which the invention is applied has a handling tube 2 receiving a transmission shaft 1. Cutting blade unit 3 is connected to one end of the handling tube 2 while grips 4, 4 are attached to intermediate portions of the handling tube 2. The handling tube 2 is connected at its other end to an internal combustion engine 5. In operation, the cutting blades of the cutting blade unit 3 are driven by the internal combustion engine 5 through the transmission shaft 1 to mow the grass or the like. The vibration damping device, generally represented by A, is disposed in the juncture between the handling rube 2 and the internal combustion engine 5.

The construction of the vibration damping device A will be explained hereinunder with reference to FIGS. 2 thru 5. The vibration damping device A has an engine-side holder member 6 having an inside diameter suitable for fitting around the handling tube 2. The holding member 6 is provided at its one end with an inward flange 18 for positioning the handling tube 2 and at its other end with an outward flange 19 which contacts and locates a ring-shaped vibration damping ring 7. The vibration damping ring 7 is made of a rubber or the like material and is fitted and fixed to the outer surface of the holding member 6 by bonding, welding or the like. Similarly, a cutter-side holding member 8, having a through bore 20 for receiving the handling tube 2, is provided with an outward flange 21 for contacting and locating a vibration damping ring 9 fitted and fixed to the outer surface thereof so as to position the vibration damping ring 9. The end of the holding member 8 for receiving the handling rod 2 is provided with a split portion 22 to which a screw 10 is driven to fix the handling tube 2 to the holding member 8. An outer sleeve is composed of two substantially semi-cylindrical halves 11 and 12. These halves 11 and 12 are provided in their inner peripheral surface with grooves 23 and 24 for receiving in free state the vibration damping rings 7, 9 in such a manner that the holding members 6 and 8 are held coaxially with the handling tube 2 with a suitable distance preserved between the outward flanges 19 and 21 of the holding members 6 and 8. The two halves 11, 12 of the outer sleeve are provided at their ends closer to the internal combustion engine 5 with recesses which form a bearing chamber 25 for receiving bearings 14 by which the boss 13 of a clutch drum B is carried rotatably. The same ends of the halves 11, 12 of the outer sleeve are provided with complementary halves 26 and 27 of a flange for securing the outer sleeve to the internal combustion engine 5. Thus, in the illustrated embodiment, the outer sleeve is split into the two halves 11, 12 over its entire length along the axis thereof at a horizontal splitting plane C as will be best seen from FIGS. 3 thru 5.

Figure 2:
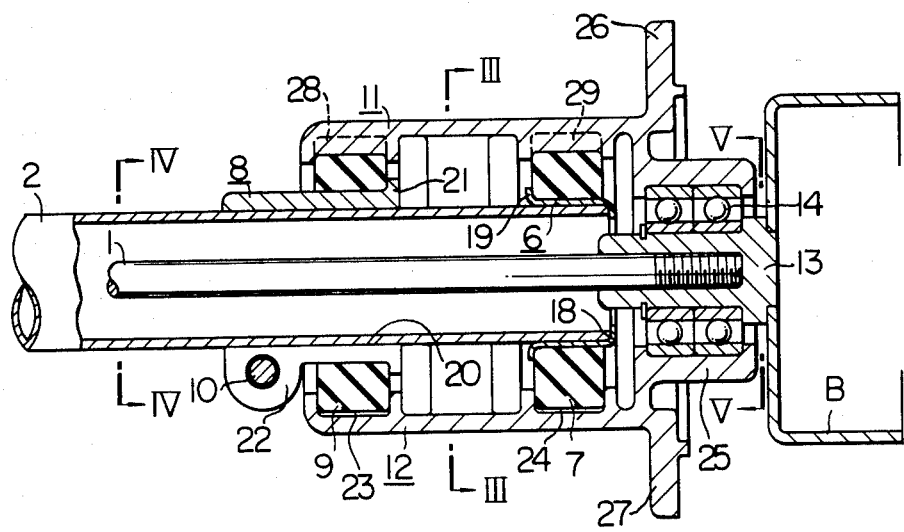
FIG. 2 is a vertical sectional view of an essential part of the vibration damping device.
Figure 3:
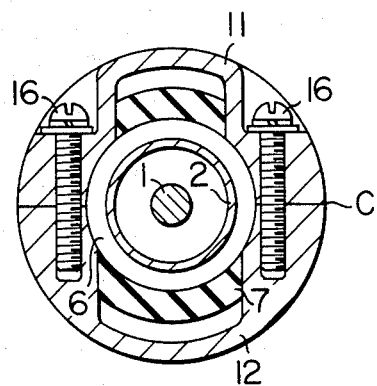
FIG. 3 is a sectional view taken along the line III—III of FIG. 2.
Figure 4:
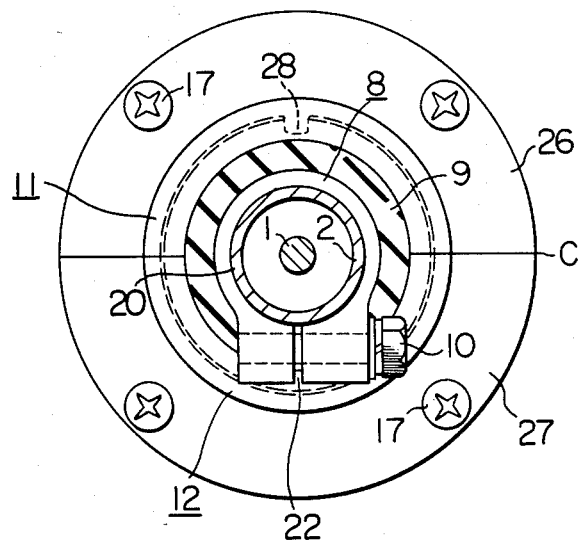
FIG. 4 is a view taken along the line IV—IV of FIG. 2.
Figure 5:
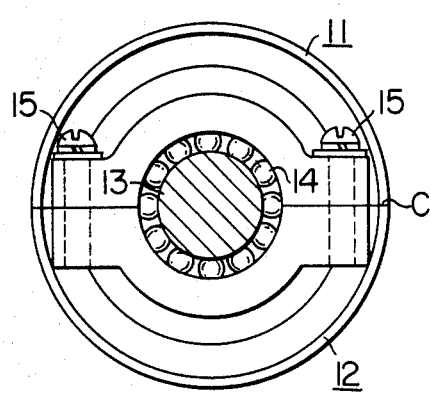
FIG. 5 is a view taken along the line V—V of FIG. 2.

In assembling, the bearings 14 embracing the boss 13 of the clutch drum B is placed in the axial end recess of the half 12 of the outer sleeve constituting the bearing chamber 25, while the vibration damping members 7, 9 are fitted in the grooves 23 and 24 of the half 12 of the outer sleeve, as will be seen from FIG. 2. Then, the other half 11 of the outer sleeve is coupled to the first-mentioned half 12 and two halves 11, 12 of the outer sleeve are secured to each other by screws 15,15 and 16, 16 at their portions adjacent to the bearing chamber 25 and adjacent to the vibration damping rings 7, 9 to complete the outer sleeve. Preferably, the grooves 23 and 24 in the halves 11, 12 of the outer sleeve are provided with suitable retaining means such as ribs 28 and 29, for locating the holding members 6, 8, and for preventing circumferential offset of the holding members 6, 8 from two halves 11, 12 of the outer sleeve.

Thus, the vibration damping device A of the invention is completed as a unit with the clutch drum B.

For incorporating the vibration damping device A in the mowing machine, the clutch drum B is inserted into an opening formed in the output side of the body of the internal combustion engne 5 which is assembled separately. Then, the outer sleeve is fixed to the internal combustion engine 5 at its flange 26, 27 by means of screws 17. Then, the handling tube 2 receiving the transmission shaft 1 is inserted into the through bore 20 of the cutter-side holding member 8 opposite to the internal combustion engine 5 until the end of the handling tube 2 is stopped by the inward flange 18 of the engine-side holding member 6, and the end of the transmission shaft 1 is connected to the boss 13. Subsequently, the bolt 10 at the split portion 22 of the cuter-side holding member 8 is tightened to fix the holding member 8 to the handling tube 2 thus completing the assembling of the mowing machine with the vibration damping device A incorporated between the internal combustion engine 5 and the handling tube 2.

What is claimed is:

1. In a mowing machine having a handling tube (2) receiving a transmission shaft (1) operatively connected to an internal combustion engine (5),
   a vibration damping interconnecting device comprising
   an axially splittable outer sleeve composed of two semi-cylindrical halves (11,12) having flange means (26,27) connecting said outer sleeve to the internal combustion engine,
   a pair of axially spaced vibration damping rings,
   a first holding member (8) between said handling tube (2) and an inner peripheral surface of one of said vibration damping rings,
   a second holding member (6) between said handling tube (2) and an inner peripheral surface of the other of said pair of vibration damping rings,
   said first holding member (8) having a radially outward extending flange (21) against a side of said vibration damping ring (9) adjacent said first holding member (8),
   said second holding member (6) having a radially outward extending flange (19) against a side of said vibration damping ring (7) adjacent said second holding member (6) and an inward extending flange positioning said handling tube (2),
   a rib (28, 29) on at least one of said semicylindrical halves against the outer peripheral surface of each of said damping rings (9,7),
   and a groove (23,24) on at least one of said semicylindrical halves along a portion of the outer peripheral surface of each of said damping rings (9,7).

* * * * *